Patented Oct. 31, 1939

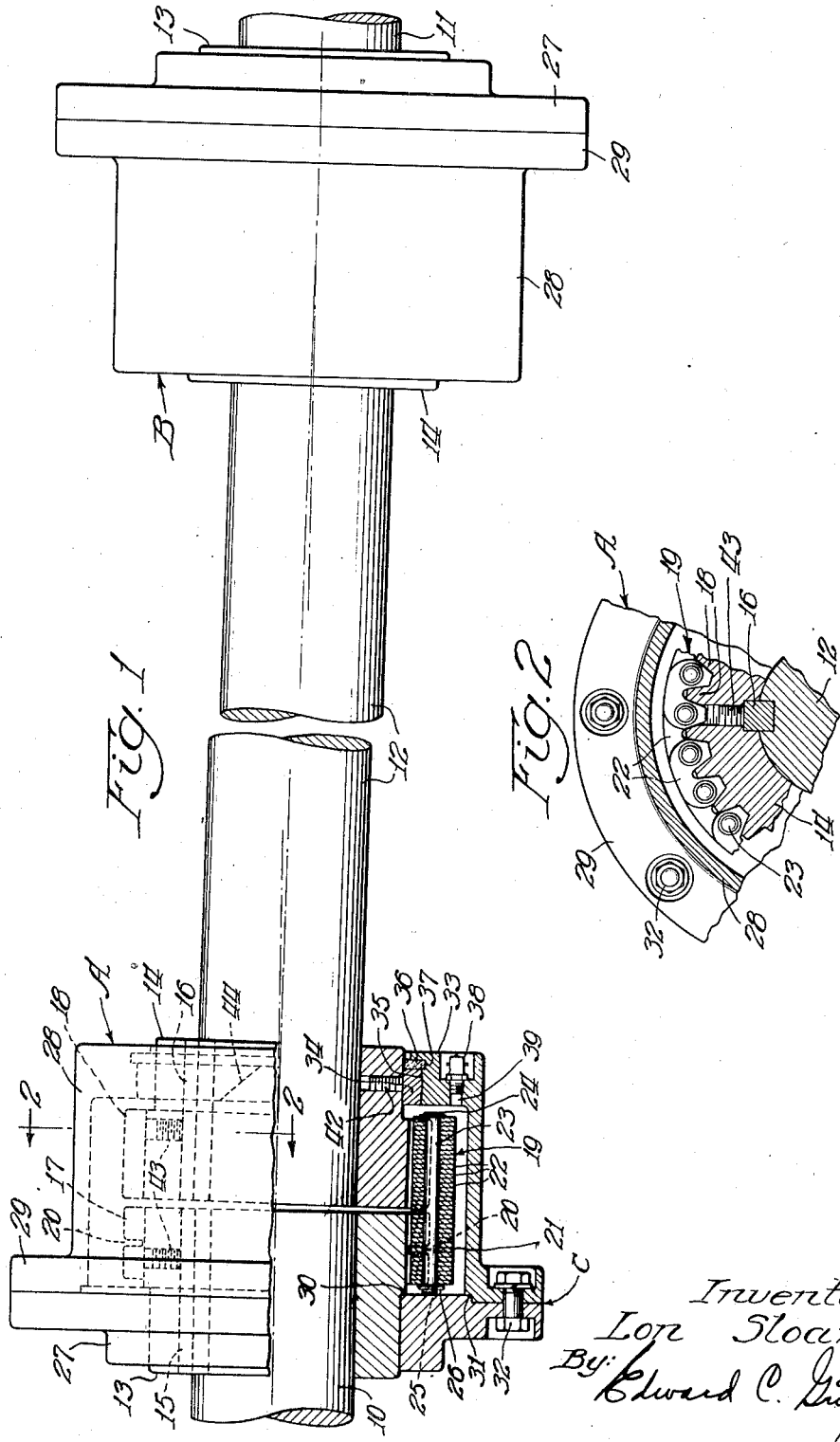

2,177,845

UNITED STATES PATENT OFFICE 2,177,845

FLOATING SHAFT COUPLING

Lon Sloan, Chicago, Ill., assignor to Morse Chain Company, Ithaca, N. Y., a corporation of New York Application April 1, 1937, Serial No. 134,215

5 Claims. (Cl. 64—19)

This invention relates to flexible couplings and particularly to flexible couplings of the mechanical type, that is, couplings in which flexibility is obtained through means other than the resilience of materials.

The object of this invention is an improved coupling for power shafts which may be misaligned and in which such misalignment is reduced by the use of a floating shaft.

A feature of this invention is a housing for a coupling made of two parts, the division between the parts of the housing being transversely of the axis of the coupling.

Another feature is a division of the coupling into parts such that a removal of one part exposes the entire coupling means for the shafts and thereby renders the coupling means accessible for repair or replacement.

Still another feature is an aperture in one of the parts of the coupling which is sealed against loss of lubricant and which permits axial misalignment between the shafts coupled therein.

These and other features and objects of the invention will become apparent from the following detailed description when taken in connection with the accompanying drawing in which:

Fig. 1 is a side elevation of a coupling and floating shaft assembly embodying this invention, and Fig. 2 is a fragmentary front elevation in section showing the means for connecting the two portions of the coupling together.

In its preferred form, this invention comprises broadly a pair of hubs mounted respectively on the driving and driven shafts, sprockets formed integrally with adjacent portions of the hubs, a continuous chain extending across and around both sprockets to form the driving connection therebetween, and a housing which is formed from a flange on one of the hubs and a flanged cylinder on the other hub, the cylinder being co-extensive with the sprockets, chain and hub.

Referring now to the drawing for a detailed description of the invention, 10 and 11 are shafts of a power system which are to be mechanically coupled together so that torque from one may be transmitted to the other. Either shaft may be the driving shaft, but for purposes of illustration, shaft 10 will be assumed to be the driving shaft, and shaft 11 the driven shaft. These shafts may be in parallel axial misalignment as indicated. Between shafts 10 and 11 is a floating shaft 12 which is connected to driving shaft 10 by means of a coupling designated generally by the letter A and which is connected similarly to driven shaft 11 by a coupling designated generally by the letter B. The purpose of floating shaft 12 is, of course, to reduce the parallel axial misalignment and any large angular misalignment to a relatively small angular misalignment at the couplings. Couplings A and B may be identical and interchangeable and hence but one coupling is shown in detail.

Mounted on adjacent ends of shafts 10 and 12 are hubs 13 and 14, each of which is held against rotation with respect to its cooperating shaft by means of a key 15 and 16 respectively. Each key is locked in place by means of a lock nut 43. Adjacent portions of hubs 13 and 14 are toothed as at 17 and 18 to form sprockets, the teeth on both sprockets being of the same size and shape and of the same pitch.

The teeth of sprockets 17 and 18 are aligned to receive a continuous chain 19 which is sufficiently wide to extend substantially across the faces of both sprockets. One of the sprockets is grooved as at 20, and chain 19 is provided with a guide link 21 which cooperates with groove 20 to prevent axial movement of chain 19 with respect to sprockets 17 and 18. Chain 19 is preferably made from a number of relatively narrow laminations 22 which are held together by a pin 23. One such pin is made removable so that chain 19 can be replaced if necessary, and to that end is provided with a head 24 and an aperture 25 through which is threaded a cotter pin 26. Other means such as a spring clip may be used in place of cotter pin 26 to prevent pin 23 from being inadvertently withdrawn.

The housing for the coupling is comprised of a flange 27 and a cylindrical portion 28 which is provided with a companion flange 29. Flange 27 is preferably shrunk or forced upon hub 13 until it is in abutment with shoulder 30 on hub 13. It is piloted in flange 29 at 31 and secured thereto by means of bolts 32.

The opposite end 33 of cylinder 28 is apertured so that it may be slipped over hub 14. The aperture is defined by an insert 34, which is split as at 44, and the surface 35 of which is rounded as shown to provide a swivel joint between hub 14 and cylinder 28. The purpose of the swivel joint is to permit angular misalignment between shafts 10 and 12. Such misalignment causes hub 14 to rotate with a crank action with a consequent rubbing between the hub and aperture. To prevent excessive wear, therefore, insert 34 is made of a hard, wear-resistant metal such as bronze. It is understood, of course, that other materials besides bronze may be used for this insert. The aperture is sealed by a packing ring 36 which is inserted in a groove 37 located exteriorily of insert 34. This location of packing ring 36 renders insert 34 accessible to lubricant from within cylinder 28. Insert 34 may be held in place by a small screw 42 which contacts both insert 34 and the metal adjoining it. A valve 38 in connection with a passageway 39 in end 33 of cylinder 28 is provided to permit the injection of lubricant into the housing without necessitating a disassembly of the housing.

When in operation, torque is transmitted from driving shaft 10 through key 15, hub 13, sprocket 17, chain 19, sprocket 18, hub 14, key 16, to floating shaft 12 and at the opposite end in coupling B through the corresponding elements, in reverse order however, to driven shaft 11. The dead weight of floating shaft 12 plus the greater portion of the crank action of the shaft is taken by bronze insert 34 in cylinder 28 which, in turn, is supported from flange 27 through the pilot connection 31 and bolts 32. Chain 19, therefore, is subjected merely to a small portion of a crank action of floating shaft 12 in addition to the full torque load. Since the bolt circle of the flanges is relatively large, the turning moment of the load on bronze insert 34 about the inner corner C of flange 27 results in a reduced stress on bolts 32. Furthermore, the circumference of the bolt circle is sufficiently large to allow a number and size of bolts to be used which will provide a large factor of safety. Inasmuch as flange 27 at no point overhangs chain 19, the latter may be made accessible for inspection or removal by uncoupling companion flange 29 and sliding cylinder 28 to the right until chain 19 is exposed. Cotter pin 26 can be reached by means of long-nosed pliers, and when removed, pin 23 can be withdrawn and chain 19 removed. By making the housing of two parts a simple, inexpensive, neat and yet rugged construction is obtained.

It is understood that the foregoing descrption is merely illustrative of a preferred form of invention and that the scope of the invention accordingly is not to be limited thereto that is to be determined by the appended claims.

I claim:

1. A coupling for driving and driven shafts comprising a hub secured to the driving shaft, a hub secured to the driven shaft adjacent said first-mentioned hub, means for drivingly connecting said hubs, and means for supporting one of said hubs from the other of said hubs, said last-mentioned means comprising a flange rigidly mounted on the supporting hub, a housing having a flange at one end and an aperture at the other end adapted to form a close-fitting joint between the housing and supported hub, and means for securing said flanges together, the diametric distance between the securing means for the flanges being substantially greater than the axial distance from the supported hub to the flange to decrease the unit load upon the securing means.

2. A coupling for driving and driven shafts comprising a hub secured to the driving shaft, a hub secured to the driven shaft adjacent said first mentioned hub, means for drivingly connecting said hubs, and a housing for the connecting means, said housing being divided transversely of the connecting means, one division of said housing comprising a flange mounted on one of said hubs, and the other division comprising a cylinder co-extensive with the hub connecting means, one end of said cylinder being flanged and the other being partially closed to fit over the other of said hubs, and means connecting the flanges whereby one hub is supported from the other hub.

3. A coupling for driving and driven shafts comprising a hub secured to the driving shaft, a hub secured to the driven shaft adjacent said first mentioned hub, means for drivingly connecting said hubs, and means for supporting one of said hubs from the other of said hubs, said last mentioned means comprising a flange rigidly mounted on one of the hubs, a housing enclosing the connecting means and having a flange at one end and an aperture at the other end, means for securing the flanges together, and ball joint means at the apertured end for supporting the other hub for universal movement relative to the housing, said ball joint forming the sole support for the supported hub.

4. In a coupling between a driving shaft and a driven shaft, flexible connecting means between the adjacent ends of said shafts for transmitting torque therebetween, means independent of said flexible connecting means for supporting one of said adjacent ends from the other of said adjacent ends, said means including a housing assembly embracing said flexible connecting means, said assembly comprising a cylindrical wall and a pair of end wall portions, one positioned on each side of said flexible connecting means, a first one of said end walls being fixed relative to its associated shaft for maintaining a fixed axial relationship between said shaft and said cylindrical portion, the other of said end walls supportingly engaging its associated shaft but allowing a limited amount of ball and socket action to provide for a slight angular displacement relative to the axis of said cylindrical portion, said arrangement being effective to relieve said flexible connecting means of the dead weight of said last named end portion and thus reducing the wear in said flexible connection.

5. In a coupling between a driving shaft and a driven shaft, flexible connecting means between the adjacent ends of said shafts for transmitting torque therebetween, means independent of said flexible connecting means for supporting one of said adjacent ends from the other of said adjacent ends, said means including a housing assembly embracing said flexible connecting means, said housing assembly comprising a cylindrical outer wall portion, a first end wall portion fixed relative to one of said shafts for maintaining a fixed axial relationship between said shaft and said cylindrical portion, a second end wall portion provided wth a wear-resisting insert supportingly engaging the other of said shafts but providing for a limited amount of ball and socket action, a sealing ring adjacent said wear insert, said arrangement being effective to relieve said flexible connecting means of the dead weight of said last named shaft and thus reducing wear in said flexible connection.

LON SLOAN.